United States Patent
Hong et al.

(10) Patent No.: US 6,423,430 B1
(45) Date of Patent: Jul. 23, 2002

(54) MAGNETO-OPTICAL RECORDING MEDIUM FOR SHORT WAVELENGTH

(75) Inventors: Hyeon-chang Hong, Ansan; Yong-jin Ahn, Seoul, both of (KR)

(73) Assignee: Samsung Electronics Co., Ltd. (KR)

( * ) Notice: Subject to any disclaimer, the term of this patent is extended or adjusted under 35 U.S.C. 154(b) by 1168 days.

(21) Appl. No.: 08/503,320

(22) Filed: Jul. 17, 1995

(51) Int. Cl.$^7$ .............. B32B 15/04; B32B 15/18; B32B 18/00; G11B 11/00

(52) U.S. Cl. .............. 428/694 MM; 428/694 RE; 428/332

(58) Field of Search ............ 428/694 ML, 694 T, 428/694 TM, 694 SC, 694 LE, 694 MT, 694 RE, 694 MM, 694 EC, 332, 64.3; 369/13

(56) References Cited

U.S. PATENT DOCUMENTS

| | | | |
|---|---|---|---|
| 5,030,512 A | * 7/1991 | Kato et al. ............ 428/336 |
| 5,053,287 A | * 10/1991 | Mizumoto et al. ......... 428/694 |
| 5,094,925 A | * 3/1992 | Ise et al. .............. 428/694 |
| 5,143,798 A | * 9/1992 | Fujii ................... 428/694 |
| 5,357,494 A | * 10/1994 | Aratani ................. 369/13 |
| 5,420,833 A | * 5/1995 | Tanaka et al. ........... 369/13 |
| 5,428,586 A | * 6/1995 | Kobayashi et al. ........ 369/13 |
| 5,452,272 A | * 9/1995 | Murakami et al. ......... 369/13 |

\* cited by examiner

*Primary Examiner*—Deborah Jones
*Assistant Examiner*—Michael LaVilla
(74) *Attorney, Agent, or Firm*—Burns, Doane, Swecker & Mathis, L.L.P.

(57) ABSTRACT

A magneto-optical recording medium for short wavelength in which a dielectric layer, a reproducing/recording bilayer made of $(Nd_x(TbFeCoCr)_{100-x}/(TbFeCoCr)$ or $(Nd_aGd_b(TbFeCoCr)_{100-(a+b)}/(TbFeCoCr)$, a protective layer and a reflective layer are, in sequence, formed on a substrate, which is superior in magnetic and magneto-optical properties at a short wavelength range in addition to being of high data storage density, high data transfer rates and long data archival capability.

14 Claims, 6 Drawing Sheets

MAGNETO-OPTICAL RECORDING MEDIUM FOR SHORT WAVELENGTH

BACKGROUND OF THE INVENTION

1. Field of the Invention

The present invention relates, in general, to a magneto-optical recording medium for use with short wavelengths and, more particularly, to a magneto-optical recording medium with high data storage density, high data transfer rates and long data archival capability.

2. Description of the Prior Art

The variety of information has explosively increased in the present information-intensive society. Such an information explosion requires a recording media to be higher in data storage density and data transfer rate and to be faster in operation.

Currently, the practical or commercial techniques for recording data are substantially based on magnetic recording technology. In general, data are stored on magnetic media, such as video tapes, audio tapes, floppy disks and the like, on which information is recorded depending on the direction of magnetization of magnetic substances in the magnetic recording media.

While the magnetic recording technology is commercially successful and advantageous, a recording technique known generically as optical recording has been and continues to be considered a very promising alternative for the storage of data, optical recording media has a higher capacity which is demanded in response to the enormous amount of information resulting from the society's development.

A magneto-optical recording medium, in contrast with the magnetic medium, comprises a recording layer magnetizable in perpendicular to the plane of the layer itself. In addition, the coercive force (Hc) of magneto-optical recording medium, a strength capable of being maintained in the magnetized state, is about 5 to 10 times as high as that of a magnetic medium. Accordingly, it is very difficult to change a previous direction of magnetization with an external magnetic field. The recording of information on a magneto-optical recording layer is effected by first focusing a modulated laser beam on a surface of the layer within 1 $\mu$m in diameter, the laser beam power being sufficient to heat the layer locally, for example, to the Curie point temperature of the layer. In this state, a direction of magnetization can be changed with an external magnetic field, so as to record information on the layer according to the direction.

When information is recorded by this method, the recorded unit of information comes to be reduced into 1 $\mu$m or less. Accordingly, the recording density of magneto-optical recording medium is 10 to 1,000 times greater than that of a conventional magnetic recording medium. In addition, the magneto-optical medium employs a non-contact reading method, so that magneto-optical recording potentially has significant advantages over magnetic recording, including easier data preservation and longer data archival capability.

In the last few years, personal computers have begun to appear in the market; with a multimedia system as the most widely adopted structure, wherein moving picture information is processed. Additionally recording systems which demand a recording medium a quite-high data storage density, for example, optical filing systems, digital-video disk recording systems and so on have become widespread. To meet the demand, magneto-optical recording media for use with short wavelengths has been employed.

The first generation magneto-optical recording disk typically has a data storage capacity of 128 MB or 650 MB in a diameter of 3.5 inches or 5.25 inches for each. The 3.5 inch magneto-optical recording disk is usually used in a personal computer whereas the 5.25 inch is introduced into an optical filing system. Since these magneto-optical recording disks comprising a recording layer of TbFeCo film take advantage of a laser beam with a wavelength of 830 nm, they are superior in perpendicular magnetization and high in magneto-optical effect (Kerr rotation angle, $\Theta_k$), showing a carrier to noise (C/N) ratio of 45 dB or greater.

However, much larger capacity is required, in order to process more information which is now needed by many electromagnetic systems. For example, a capacity of 6 GB or more is required for a recording medium which is used to process moving pictures of high definition television quality in an optical filing system for a super computer or a digital-video disk recording system. In optical recording art, it is considered that the use of a laser beam having shorter wavelength brings about higher data storage density. For example, a blue laser beam with a wavelength of 400 nm, compared to a wavelength of 830 nm, makes a laser beam-focused spot reduced to one fourth in area, which results in an improvement of four times higher recording density. Accordingly, magneto-optical recording media for use with a short wavelength are strongly demanded.

Referring to FIG. 1, there is shown a conventional magneto-optical recording medium having a multilayer structure wherein substrate 1, dielectric layer 2, recording layer 3, protective layer 4 and reflective layer 5 are, in sequence, laminated. As shown in this figure, the recording layer of the conventional magneto-optical recording medium is a single layer made of TbFeCo, an alloy of rare-earth metal and transient metal. At a laser wavelength of 830 nm, this TbFeCo layer is favorably magnetized perpendicular to the plane of itself and thus, information is recorded well therein. In addition, it shows good characteristics on readout of information because of its large Kerr rotation angle at this laser wavelength.

When used at a short wavelength region (below 532 nm), the monolayer consisting exclusively of TbFeCo, however, represents a low Kerr rotation angle which is only 60% of that at 830 nm. Under the condition, the conventional magneto-optical recording medium comprising the recording monolayer exhibits a C/N ratio of 45 dB or less and thus has difficulty in readout of information.

SUMMARY OF THE INVENTION

As explained above, the conventional magneto-optical recording medium which has a recording layer of TbFeCo just above a dielectric layer on a substrate has a large Kerr rotation angle enough to present reliable reproducing characteristics in addition to being good in perpendicular magnetization and recording characteristics, at a laser wavelength of 830 nm. In contrast, at a short wavelength range of not more than 532 nm, it suffers from a problem on readout of information, for the Kerr rotation angle is 60% as high as that at 830 nm, lowering the C/N ratio to 45 dB or less.

The present inventor has intensively researched and studied these problems and found that a reproducing/recording bilayer structure inserted between the dielectric layer and the protective layer enables the magneto-optical recording medium to display superior magneto-optical properties even at a short wavelength range of not more than 532 nm.

Accordingly, it is an object of the present invention to overcome the above problems encountered in prior art and to provide a magneto-optical recording medium which is superior in magnetic and magneto-optical properties at a short wavelength range.

It is another object of the present invention to provide a magneto-optical recording medium for short wavelength with high data storage density, high data transfer rate and long data archival capability.

In accordance with the present invention, the above objects could be accomplished by providing a magneto-optical recording medium for use with short wavelength in which a dielectric layer, a protective layer and a reflective layer are, in sequence, formed on a substrate, the magneto-optical recording medium comprising a reproducing/recording bilayer structure between said dielectric layer and the protective layer, said bilayer being made of $(Nd_x(TbFeCoCr)_{100-x})/(TbFeCoCr)$.

BRIEF DESCRIPTION OF THE DRAWINGS

The above objects and other features and advantages of the present invention will be more apparent from the following detailed description with reference to the accompanying drawings, in which.

DESCRIPTION OF THE PREFERRED EMBODIMENTS

Turning now to a detailed description of the invention, it will be best understood with reference to the accompanying drawings.

Figure 1:
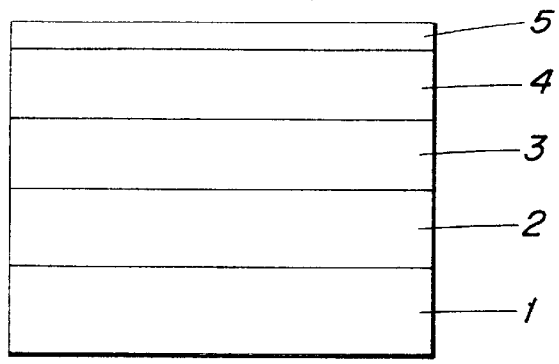
FIG. 1 is a schematic sectional view showing a conventional magneto-optical recording medium for short wavelength.
Figure 2:
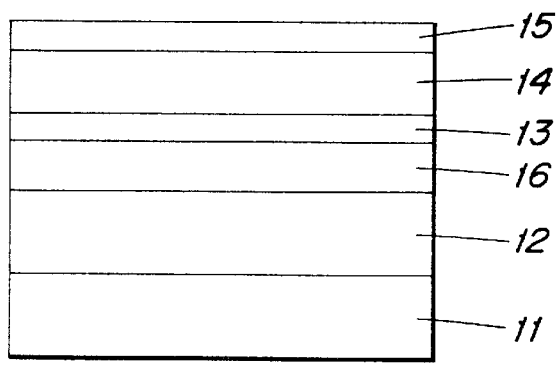
FIG. 2 is a schematic sectional view showing a magneto-optical recording medium for short wavelength, according to the present invention.
Figure 3:
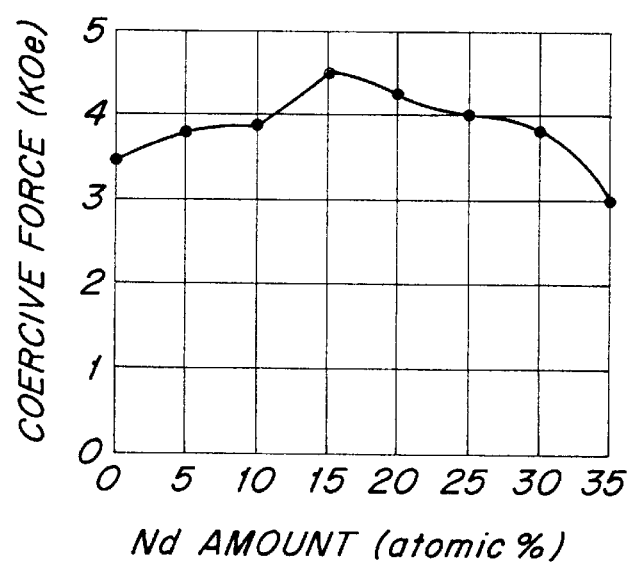
FIG. 3 is a plot showing the change of coercive force in a reproducing/recording bilayer $(Nd_x(TbFeCoCr)_{100-x})/(TbFeCoCr)$ of the present invention with regard to Nd composition.
Figure 4:
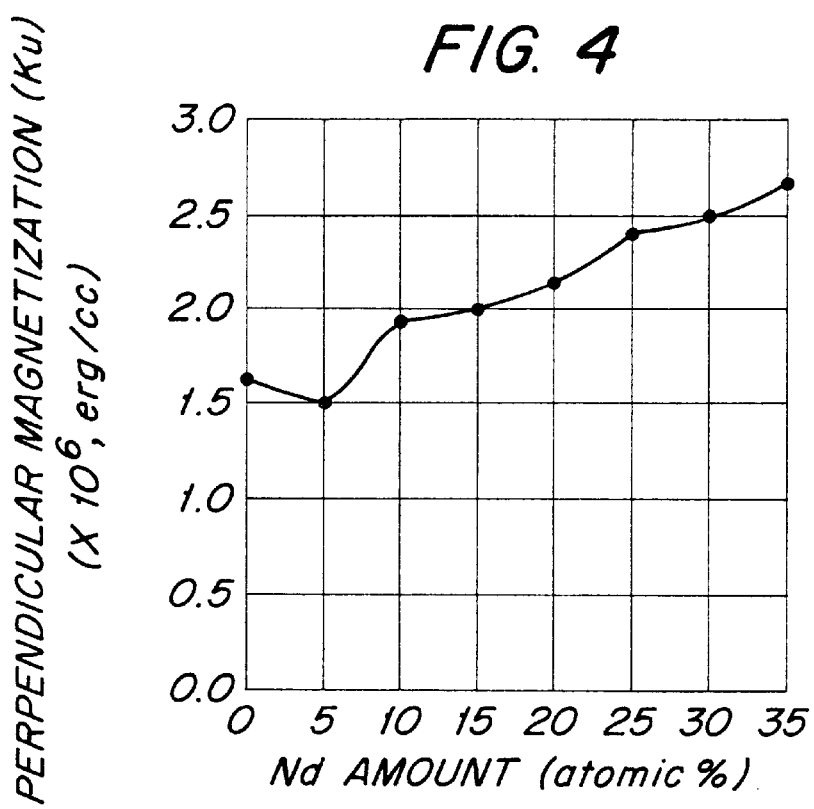
FIG. 4 is a plot showing the change of perpendicular magnetic anisotropy constant in the reproducing/recording bilayer $(ND_x(TbFeCoCr)_{100-x})/(TbFeCoCr)$ of the present invention with regard to Nd composition.
Figure 5:
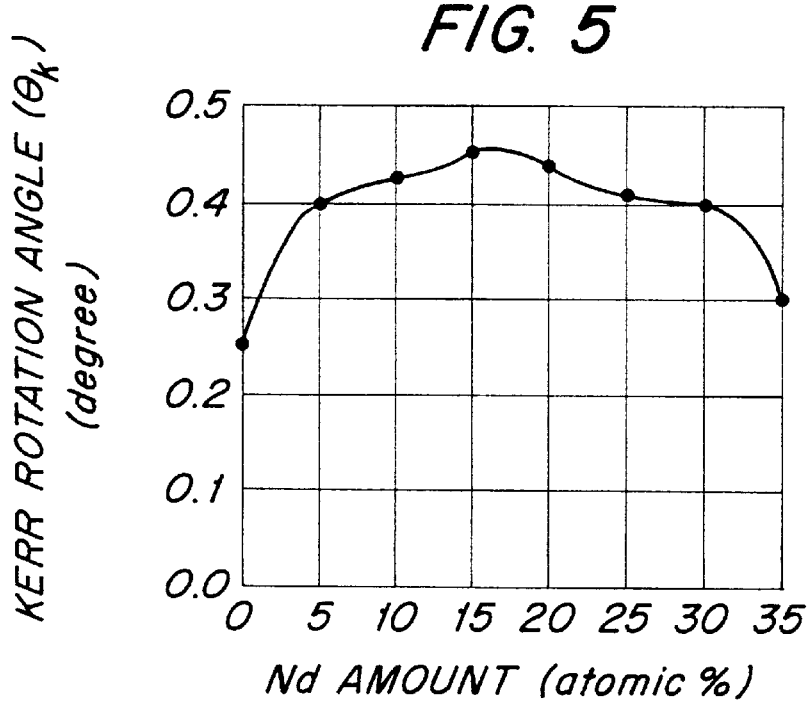
FIG. 5 is a plot showing the change of Kerr rotation angle in the reproducing/recording bilayer $(Nd_x(TbFeCoCr)_{100-x})/(TbFeCoCr)$ of the present invention with regard to Nd composition.
Figure 6:
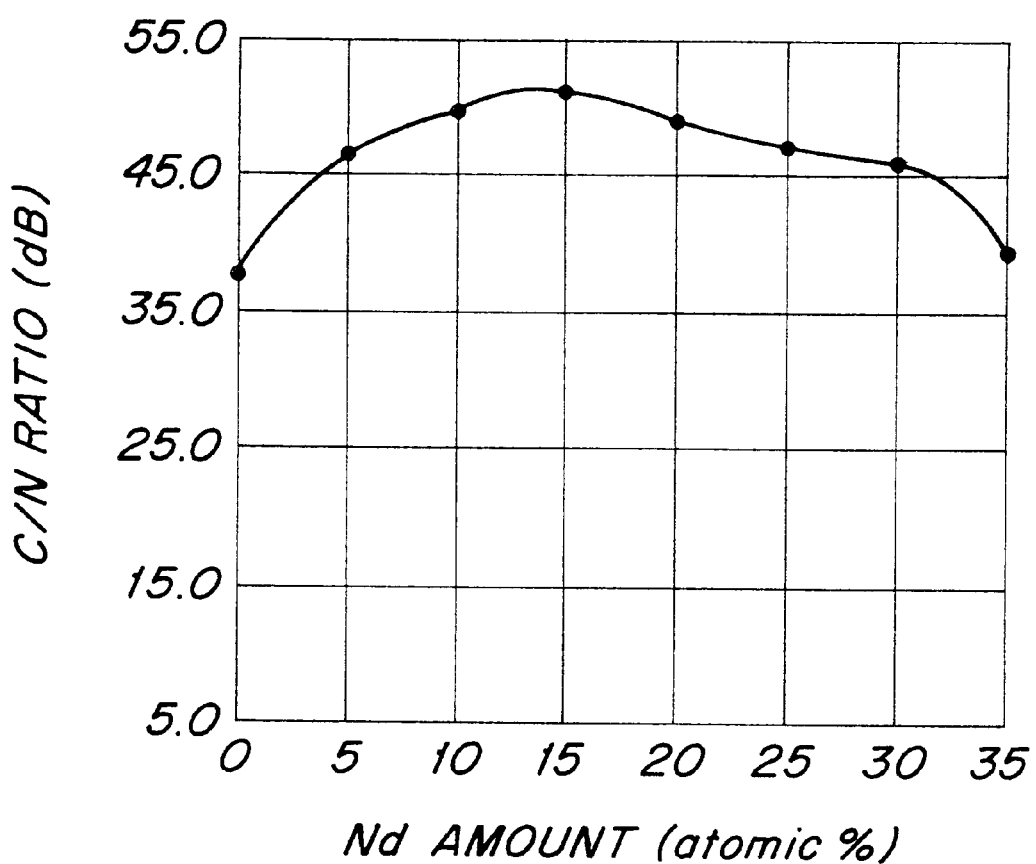
FIG. 6 is a plot showing the change of C/N ratio in the reproducing/recording bilayer $(Nd_x(TbFeCoCr)_{100-x})/(TbFeCoCr)$ of the present invention with regard to Nd composition.
Figure 7:
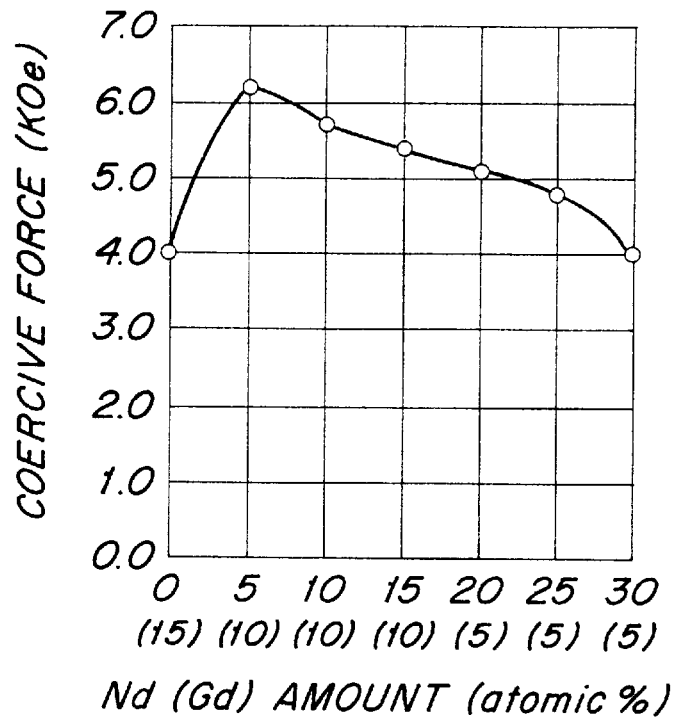
FIG. 7 is a plot showing the change of coercive force in the reproducing/recording bilayer $(Nd_aGd_b(TbFeCoCr)_{100-(a+b)})/(TbFeCoCr)$ of the present invention with regard to Nd and Gd composition.
Figure 8:
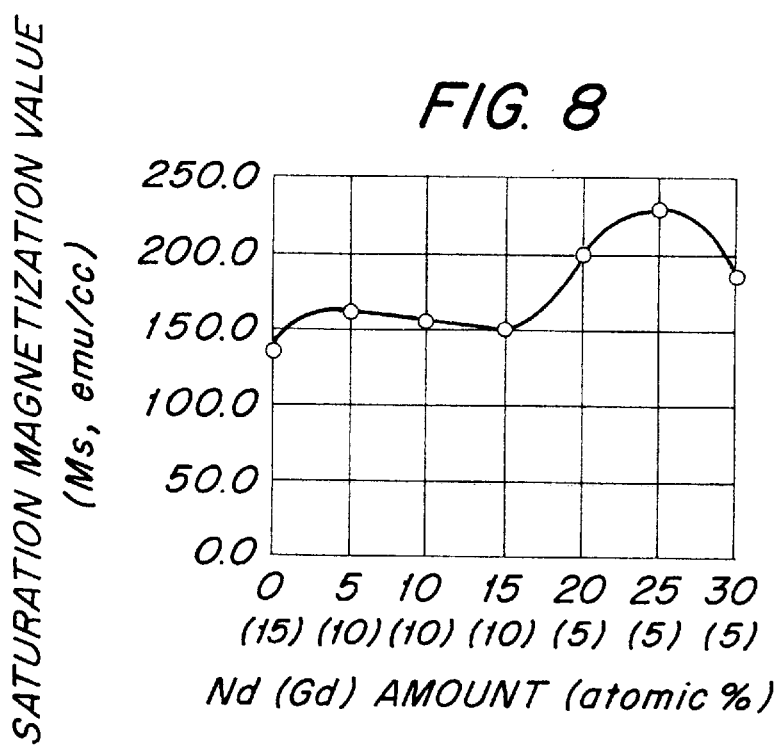
FIG. 8 is a plot showing the change of saturation magnetization in the reproducing/recording bilayer $(Nd_aGd_b(TbFeCoCr)_{100-(a+b)})/(TbFeCoCr)$ of the present invention with regard to Nd and Gd composition.
Figure 9:
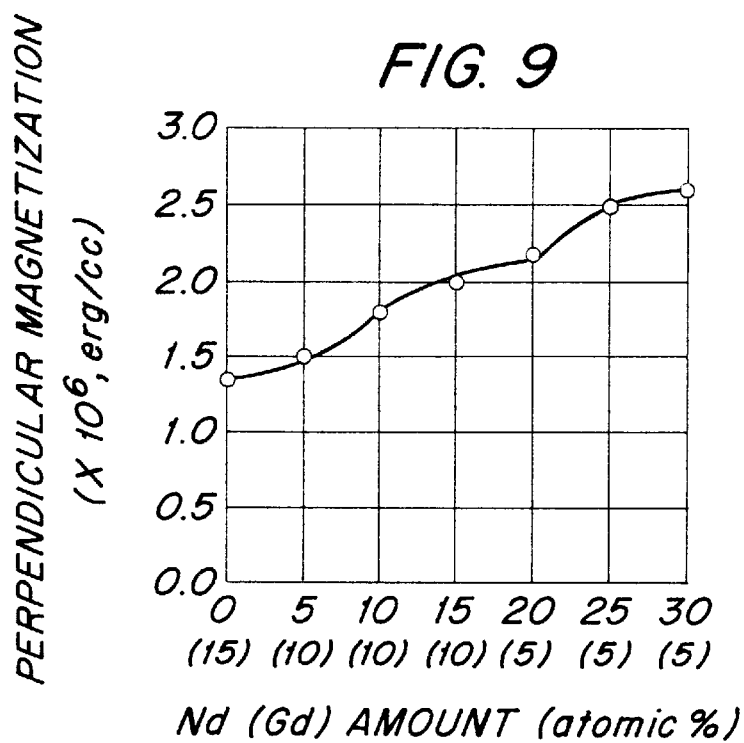
FIG. 9 is a plot showing the change of perpendicular magnetic anisotropy constant in the reproducing/recording bilayer $(Nd_aGd_b(TbFeCoCr)_{100-(a+b)})/(TbFeCoCr)$ of the present invention with regard to Nd and Gd composition.
Figure 10:
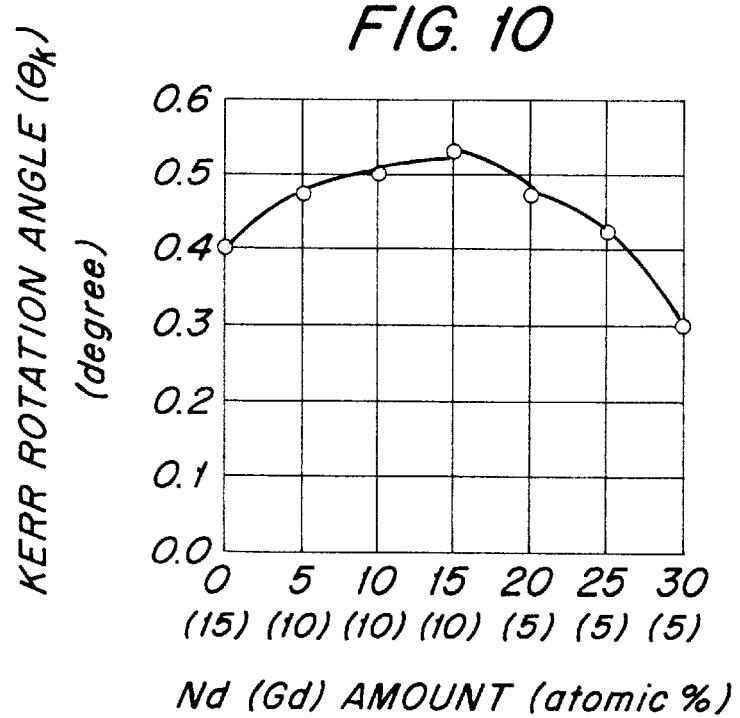
FIG. 10 is a plot showing the change of Kerr rotation angle in the reproducing/recording bilayer $(Nd_aGd_b(TbFeCoCr)_{100-(a+b)})/(TbFeCoCr)$ of the present invention with regard to Nd and Gd composition.
Figure 11:
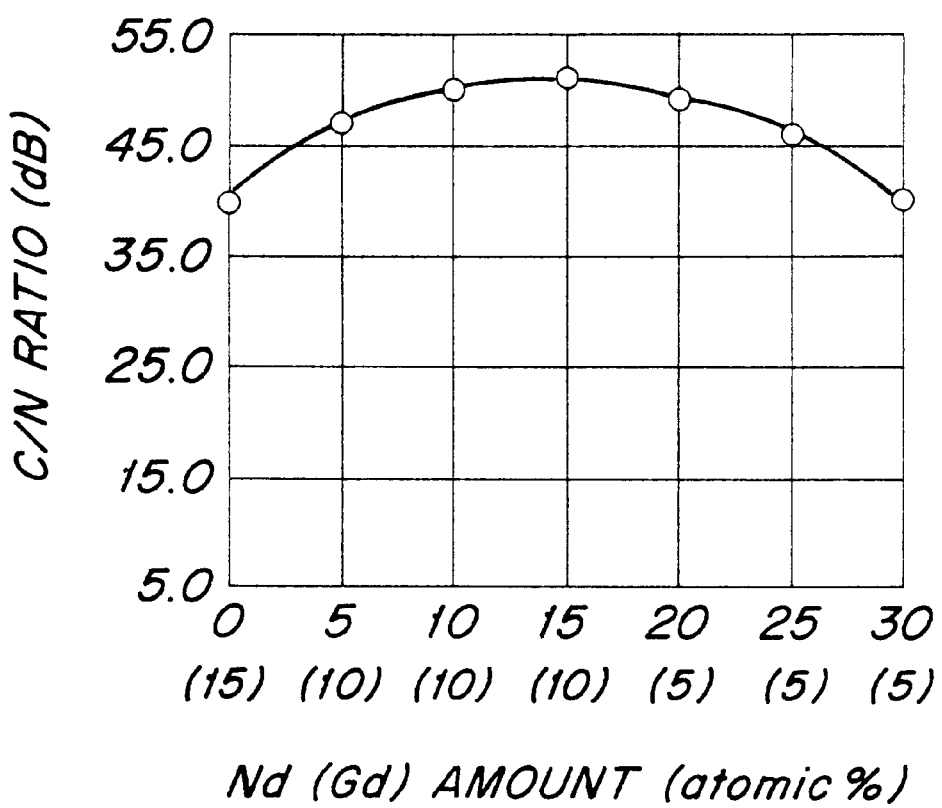
FIG. 11 is a plot showing the change of C/N ratio in the reproducing/recording bilayer $(Nd_aGd_b(TbFeCoCr)_{100-(a+b)})/(TbFeCoCr)$ of the present invention with regard to Nd and Gd composition.

Referring to FIG. 2, there is shown a magneto-optical recording medium for use with short wavelengths according to the present invention, having a multilayer structure which comprises a substrate, a dielectric layer, a recording layer, a protective layer and a reflective layer, with a reproducing layer interposed between the dielectric layer and the recording layer. As shown in FIG. 2, these layers are sequentially laminated. That is to say, on 2P glass substrate 11, there are formed dielectric layer 12, reproducing layer 16, recording layer 13, protective layer 14 and reflective layer 15, in due order. Like conventional ones, the dielectric layer and the protective layer both are made of SiN. The reflective layer may be made of either Al or Al—Ti. The two remaining layer, i.e., the recording layer and the reproducing layer, which are distinctive features of the invention, are made of $(TbFeCoCr)$ and $Nd_x(TbFeCoCr)_{100-x}$ respectively, taking advantage of exchange interaction effect.

The Tb element, although having a tendency to lower the Kerr rotation angle in a short wavelength range, enables the magneto-optical recording medium to improve in coercive force (Hc) and perpendicular magnetization (Ku). The presence of Cr element in the magneto-optical recording medium brings about not only a significant improvement in corrosion or weathering resistance, a closely relating property to its shelf life but also a decrease of saturation magnetization ($M_S$) value, an effect capable of compensating for the unstabilization of magnetic domain attributable to the Curie point temperature raise by the presence of Co element and of improvement in anisotropy constant for perpendicular magnetization.

Accordingly, the bilayer reproducing/recording structure gives large Kerr rotation angle and good perpendicular magnetization in a short wavelength range due to interchange bonding effect and thus, the magneto-optical recording medium is superior in information readout and corrosion resistance and can be used for a recording disk which stores a large quantity of information sufficient for moving pictures of HD-TV quality.

The Nd ingredient in the reproducing layer made of $ND_x(TbFeCoCr)_{100-x}$ has significant influence upon the overall characteristics of the magneto-optical recording medium. It preferably ranges in composition from about 5 to about 30 atomic percent and most preferably from about 10 to about 20 atomic percent. For example, if x is more than 30 atomic percent, the perpendicular magnetization value drops and thus is there a remarkable reduction in Kerr rotation angle. On the other hand, if x is less than 5 atomic percent, only similar Kerr rotation angle to that of the conventional TbFeCo recording layer is shown.

As for thickness, the $Nd_x(TbFeCoCr)_{100-x}$ reproducing layer is between approximately 10 and approximately 1,000 Angstroms and the TbFeCoCr recording layer between approximately 10 and approximately 1,500 Angstroms, with the total thickness of the bilayer recording structure ranging from about 20 to about 2,500 Angstroms. Too thick a reproducing layer incapacitates a laser beam from reaching the recording layer for recording or reading out of information. In the light of the thickness of the recording layer being closely connected to recording sensitivity, recording sensitivity becomes lowered when too thick a recording layer is used.

The magneto-optical recording medium according to the present invention, as described above, comprises a bilayer structure having a first layer for reproducing made of $Nd_x(TbFeCoCr)_{100-x}$ and a second layer for recording of TbFeCoCr, with the aim of effecting interchange bonding and thereby improving magneto-optical properties, C/N ratio and perpendicular magnetization, at a short wavelength range. For example, the conventional TbFeCo recording layer has a Kerr rotation angle of less than 0.25° at 532 nm. In contrast, Nd itself, a light rare earth metal, has a large Kerr rotation angle at a short wavelength range. Therefore, a magneto-optical recording disk according to the present invention represents superior reproducing characteristics. For example, the C/N ratio is as high as around 50 dB, and the Kerr rotation angle is as high as or higher than 0.4°, a specification required for a magneto-optical disk carrying moving pictures of HD-TV quality. In addition, the addition of Cr introduces the magneto-optical recording medium into being more corrosion resistant and antioxidant than TbFeCo, susceptible to oxygen.

Table 1 below gives a data of magnetic and magneto-optical properties for the bilayer reproducing($Nd_x$ $(TbFeCoCr)_{100-x}$)/recording(TbFeCoCr) structure and the monolayer recording(TbFeCo) structure.

TABLE 1

| Structure | Coercive Force (Hc) (KOe) | Perpendicular Magnetization (erg/cc) | Kerr Rotation Angle (°) | C/N Ratio (dB) | Loop Squareness ($M_R/M_S$) |
|---|---|---|---|---|---|
| Reproducing/Recording Bilayer | 4.7 | 2.0 | 0.4– 0.45 | 50 | 0.98 |
| Recording Monolayer | 4.8 | 1.7 | 0.25 | 47 | 0.70 | note:
light source: SHG, 532 nm note: light source: SHG, 532 nm

As shown in Table 1, the present magneto-optical recording medium is superior to the conventional medium in almost all measured properties. For example, Kerr rotation angle ($\Theta_k$), a representative magneto-optical property, is on the order of 0.4 to 0.45° in the bilayer recording structure, which is even higher than that in the conventional monolayer recording structure. As for dynamic characteristic, the present magneto-optical recording medium shows a C/N ratio of about 50 dB on readout of information with a laser beam of 532 nm wavelength. The TbFeCoCr recording layer maintains sufficient coercive force (Hc) and can be perpendicularly magnetized with ease, which leads to desirable magnetic properties, e.g. loop squareness (remanent magnetization ($M_R$)/saturation magnetization ($M_s$)) almost near 1.

Magnetic and magneto-optical properties of a magneto-optical recording medium comprising the bilayer reproducing($Nd_x(TbFeCoCr)_{100-x}$)/recording(TbFeCoCr) structure were measured according to the composition of Nd, and the results are given as shown in Table 2 below. In these measurements, coercive force (Hc) was tested by a vibrating sample magnetometer such as that sold by DMS Co. Ltd., U.S.A. and perpendicular magnetic anisotropy constant (Ku) by a torque magnetometer such as that sold by DMS Co. Ltd., U.S.A. Kerr rotation angle ($\theta_k$) was measured by a custom-manufactured, Kerr loop tracer using an SHG green laser beam with a wavelength of 532 nm as a light source. Measurement of C/N ratio was done by means of a dynamic tester (custom made) using an SHG green laser beam with a wavelength of 532 nm.

TABLE 2

| Nd Comp. (atomic, %) | Coercive Force (KOe) | Perpendicular Magnetization (erg/cc) | Kerr Rotation Angle (°) | C/N Ratio (dB) | Note (atomic, %) |
|---|---|---|---|---|---|
| 0 | 3.50 | 1.70 | 0.25 | 38 | 0 |
| 5 | 3.70 | 1.50 | 0.40 | 47 | 4.2 |
| 10 | 3.90 | 1.90 | 0.43 | 50 | 8.5 |
| 15 | 4.50 | 2.00 | 0.47 | 51 | 12.1 |
| 20 | 4.30 | 2.20 | 0.45 | 49 | 16.8 |
| 25 | 4.00 | 2.40 | 0.41 | 48 | 21.3 |
| 30 | 3.90 | 2.50 | 0.40 | 47 | 25.2 |
| 35 | 3.00 | 2.70 | 0.30 | 40 | 30.7 |

In this table, the note column contains the Nd composition contents which were quantitatively analyzed in an inductively coupled plasma spectrometer, saying that the Nd composition content of 5 atomic percent is effectively 4.2 atomic percent.

Referring to FIGS. 3 to 6, there are in each case plotted changes of coercive force, perpendicular magnetic anisotropy constant, Kerr rotation angle and C/N ratios with regard to the Nd composition content in the magneto-optical recording medium comprising the bilayer reproducing($Nd_x$ $(TbFeCoCr)_{100-x}$)/recording(TbFeCoCr) structure. As apparent from these plots, coercive force, Kerr rotation angle and C/N ratio exhibit generally satisfying values where the Nd composition content ranges from 5 to 30 atomic percent and more desirable values where Nd from 10 to 20 atomic percent.

In accordance with another embodiment of the present invention, the reproducing layer constituting the bilayer structure is further added with Gd and thus is its composition represented by $Nd_aGd_b(TbFeCoCr)100-(a+b)$. At a short wavelength range, Gd, a heavy rare earth metal, is large in magneto-optical effects, especially Kerr rotation angle. Hence, Gd in combination with Nd can remarkably increase the Kerr rotation angle with a synergy effect.

Significantly influencing upon the overall properties of the magneto-optical recording medium, Nd and Gd can be contained in an amount up to 25 atm percent and 15 atm percent, respectively, with the preferred total amount of Nd and Gd ranging from 5 to 30 atomic percent. If the total amount of Nd and Gd is less than 5 atm percent, the addition effect thereof is small. On the other hand, if too much Nd and Gd are used, a steep drop of perpendicular magnetization takes place along with de-stabilization of magnetic domain, reducing Kerr rotation angle.

In accordance with the present invention, the thickness of the $Nd_aGd_b(TbFeCoCr)100-(a+b)$ reproducing layer is on the order of about 10 to about 500 Angstroms, with the TbFeCoCr recording layer about 10 to about 1,000 Angstroms thick. Since a laser beam should pierce the reproducing layer in order to record or reproduce information, too thick reproducing layer obstructs the recording or readout of information by the laser beam. In the light of the close relation of the recording layer with recording sensitivity, recording sensitivity becomes lowered if the recording layer becomes in too thick.

Magnetic and magneto-optical properties of a magneto-optical recording medium comprising the bilayer reproducing($Nd_aGd_b(TbFeCoCr)_{100-(a+b)}$)/recording (TbFeCoCr) structure were measured according to the content of Nd and Gd, and the results are given as shown in Table 3 below. In these measurements, saturation magnetization (Ms) values was measured using a vibrating sample magnetometer such as that sold by DMS Co. Ltd., U.S.A., and the other properties, e.g. coercive force, perpendicular magnetic anisotropy constant (Ku), Kerr rotation angle ($\Theta_k$) and C/N ratio, were in each case measured by the same measuring machines under the same conditions as in the bilayer reproducing($Nd_x(TbFeCoCr)_{100-x}$)/recording (TbFeCoCr) structure.

TABLE 3

| Composition (atomic, %) | | Hc | $M_S$ | Ku | $\Theta_k$ | C/N Ratio |
|---|---|---|---|---|---|---|
| Gd | Nd | (KOe) | (emu/cc) | (erg/cc) | (°) | (dB) |
| 15 | 0  | 4.00 | 145 | 1.30 | 0.40 | 39 |
| 10 | 5  | 6.20 | 160 | 1.50 | 0.47 | 48 |
| 10 | 10 | 5.80 | 155 | 1.80 | 0.50 | 50 |
| 10 | 15 | 5.50 | 150 | 2.00 | 0.52 | 53 |
| 5  | 20 | 5.20 | 200 | 2.20 | 0.48 | 48 |
| 5  | 25 | 4.80 | 230 | 2.50 | 0.42 | 46 |
| 5  | 30 | 4.00 | 180 | 2.60 | 0.30 | 40 |

Referring to FIGS. 7 to 11, there are in each case plotted changes of coercive force, saturation magnetization, perpendicular magnetic anisotropy constant, Kerr rotation angle and C/N ratio with regard to the Nd and Gd composition content in the magneto-optical recording medium comprising the bilayer reproducing($Nd_aGd_b(TbFeCoCr)_{100-(a+b)}$)/ recording(TbFeCoCr) structure. As apparent from these plots, Kerr rotation angle and C/N ratio exhibit generally satisfying values where the Nd and Gd composition contents each are within the ranges according to the present invention and more desirable values when Nd ranges from 10 to 20 atomic percent and Gd ranges from 5 to 10 atomic percent. It is revealed that perpendicular magnetization and Kerr rotation angle are degraded where the Nd and Gd composition contents are out of the ranges according to the present invention.

The magneto-optical recording media with a combination of Nd and Gd, in accordance with another embodiment of the present invention, have excellent magneto-optical properties at a short wavelength range, e.g. Kerr rotation angle of 0.5 or more, which are based on their synergy effect. As mentioned previously, Cr enables the magneto-optical recording medium not only to be more resistant to corrosion or weathering, a closely relating property to its shelf life, but to have a decreased saturation magnetization value which results in stabilization of magnetic domain. They are also high in perpendicular magnetization anisotropy constant, a reliability-relating property. In addition, the interchange bonding between the recording layer and the reproducing layer allows them to have high Kerr rotation angle and perpendicular magnetization both. For example, a magneto-optical recording medium with a combination of 10 atm percent Gd and 10 atm percent Nd shows a C/N ratio of about 50 dB on readout of information.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A magneto-optical recording medium for use in a recording medium including a dielectric layer, a protective layer and a reflective layer formed in sequence on a substrate, said magneto-optical recording medium comprising a bilayer structure located between said dielectric layer and said protective layer, said bilayer structure comprising a reproducing layer comprising $Nd_aGd_b(TbFeCoCr)_{100-(a+b)}$ wherein a and b are atomic percentages and a recording layer comprising TbFeCoCr.

2. A magneto-optical recording medium in accordance with claim 1, wherein a is not greater than about 25 atomic percent and b is not greater than about 15 atomic percent, respectively, in the $Nd_aGd_b(TbFeCoCr)_{100-(a+b)}$ reproducing layer.

3. A magneto-optical recording medium in accordance with claim 1, wherein the reproducing layer of said bilayer structure is about 10 to about 500 Angstroms thick.

4. A magneto-optical recording medium in accordance with claim 1, wherein the recording layer of said bilayer structure is about 10 to about 1,000 Angstroms thick.

5. A recording medium comprising:

a substrate;

a dielectric layer;

a magneto-optical recording medium comprising a bilayer structure, said bilayer structure comprising a reproducing layer and a recording layer, said reproducing layer comprising $Nd_x(TbFeCoCr)_{100-x}$ wherein x is an atomic percentage with a value greater than 0 and said recording layer comprising TbFeCoCr;

a protective layer; and a reflective layer.

6. A recording medium in accordance with claim 5, wherein the value of x is between about 5 to about 30 atomic percent in $Nd_x(TbFeCoCr)_{100-x}$ for the reproducing layer of said bilayer structure.

7. A recording medium in accordance with claim 5, wherein the value of x is between about 10 to about 20 atomic percent in $Nd_x(TbFeCoCr)_{100-x}$ for the reproducing layer of said bilayer structure.

8. A recording medium in accordance with claim 5, wherein the reproducing layer of said bilayer structure is about 10 to about 1,000 Angstroms thick.

9. A recording medium in accordance with claim 5, wherein the recording layer of said bilayer structure is about 10 to about 1,500 Angstroms thick.

10. A recording medium in accordance with claim 5, wherein said bilayer structure is about 20 to about 2,500 Angstroms thick.

11. A recording medium comprising:

a substrate;

a dielectric layer;

a magneto-optical recording medium comprising a bilayer structure, said bilayer structure comprising a reproducing layer and a recording layer, said reproducing layer comprising $Nd_aGd_b(TbFeCoCr)_{100-(a+b)}$ wherein a and b are atomic percentages each with a value greater than 0 and said recording layer comprising TbFeCoCr;

a protective layer; and a reflective layer.

12. A recording medium in accordance with claim 11, wherein a is not greater than about 25 atomic percent and b is not greater than about 15 atomic percent, respectively, in the $Nd_aGd_b(TbFeCoCr)_{100-(a+b)}$ reproducing layer.

13. A recording medium in accordance with claim 11, wherein the reproducing layer of said bilayer structure is about 10 to about 500 Angstroms thick.

14. A recording medium in accordance with claim 11, wherein the recording layer of said bilayer structure is about 10 to about 1,000 Angstroms thick.

* * * * *